United States Patent Office 3,549,620
Patented Dec. 22, 1970

3,549,620
SUBSTITUTED HEXAHYDRO-1-PHENYL-1H-2,6-BENZODIAZONINES
William J. Houlihan, Mountain Lakes, N.J., assignor to Sandoz-Wander, Inc., Hanover, N.J., a corporation of Delaware
No Drawing. Filed June 30, 1966, Ser. No. 561,745
Int. Cl. C07d 53/00
U.S. Cl. 260—239                                    7 Claims

ABSTRACT OF THE DISCLOSURE

Hexahydro - 6 - lower alkyl - 1 - aryl - 1H - 2,6 - benzodiazonines, e.g., 1 - p - chlorophenyl - 6 - methyl-2,3,4,5,6,7 - hexahydro - 1H - 2,6 - benzodiazonine, are prepared from corresponding 2-(3-hydroxypropyl)-4-aryl-1-2H-phthalazinones and are useful as central nervous system stimulants.

---

This invention relates to novel heterocyclic compounds. In particular, the invention is concerned with 2,3,4,5,6,7-hexahydro - 6 - lower alkyl - 1 - phenyl - 1H - 2,6-benzodiazonines and processes for preparing the same. The invention also pertains to intermediates which are useful in preparing the above compounds and processes for preparing said intermediates.

The end compounds of the present invention may be represented structurally as follows:

$$\text{I}$$

wherein

R represents hydrogen; lower alkyl, straight or branched chain and preferably containing from 1 to 4 carbon atoms, e.g., methyl, ethyl, isopropyl and butyl; cyclo-lower alkyl, preferably containing from 3 to 6 carbon atoms, e.g., cyclopropyl, cyclopentyl and cyclohexyl; or phenyl;

R', R" and R''' each represent hydrogen; chlorine; straight chain lower alkyl, preferably containing from 1 to 4 carbon atoms, e.g., methyl, ethyl, propyl and butyl;

$R^{iv}$, $R^v$ and $R^{vi}$ each represent hydrogen, chlorine, fluorine; straight chain lower alkyl, preferably containing from 1 to 4 carbon atoms, e.g., methyl, ethyl, propyl and butyl; straight chain lower alkoxy, preferably containing from 1 to 4 carbon atoms, e.g., methoxy, ethoxy, propoxy and butoxy; or $R^v$ together with either $R^{iv}$ or $R^{vi}$ form a methylenedioxy bridge; and $R^{vii}$ represents straight chain lower alkyl, preferably containing from 1 to 4 carbon atoms, e.g., methyl, ethyl, propyl and butyl; allyl; propargyl; or benzyl.

As representative of the compounds of Formula I encompassed within the scope of the present invention, there may be mentioned the following:

1-phenyl-6-methyl-2,3,4,5,6,7-hexahydro-1H-2,6-benzodiazonine
1-phenyl-4-methyl-6-ethyl-2,3,4,5,6,7-hexahydro-1H-2,6-benzodiazonine
1-phenyl-4-cyclohexyl-6-allyl-2,3,4,5,6,7-hexahydro-1H-2,6-benzodiazonine
1-phenyl-4-methyl-6-propargyl-2,3,4,5,6,7-hexahydro-1H-2,6-benzodiazonine
1,4-diphenyl-6-methyl-2,3,4,5,6,7-hexahydro-1H-2,6-benzodiazonine
1-phenyl-4-ethyl-6-benzyl-2,3,4,5,6,7-hexahydro-1H-2,6-benzodiazonine
1-phenyl-4-cyclopentyl-6-ethyl-2,3,4,5,6,7-hexahydro-1H-2,6-benzodiazonine
1-phenyl-6-ethyl-8-chloro-2,3,4,5,6,7-hexahydro-1H-2,6-benzodiazonine
1-phenyl-6-benzyl-9-ethyl-2,3,4,5,6,7-hexahydro-1H-2,6-benzodiazonine
1-phenyl-6-methyl-8,9-dichloro-2,3,4,5,6,7-hexahydro-1H-2,6-benzodiazonine
1-phenyl-6,9-dimethyl-8-chloro-2,3,4,5,6,7-hexahydro-1H-2,6-benzodiazonine
1-phenyl-6-propargyl-10-methyl-2,3,4,5,6,7-hexahydro-1H-2,6-benzodiazonine
1-phenyl-6-benzyl-8,10-diethyl-2,3,4,5,6,7-hexahydro-1H-2,6-benzodiazonine
1-p-chlorophenyl-6-methyl-2,3,4,5,6,7-hexahydro-1H-2,6-benzodiazonine
1-p-chlorophenyl-6,8-dimethyl-2,3,4,5,6,7-hexahydro-1H-2,6-benzodiazonine
1-p-methoxyphenyl-6-benzyl-2,3,4,5,6,7-hexahydro-1H-2,6-benzodiazonine
1-(3-chlorophenyl)-6-allyl-2,3,4,5,6,7-hexahydro-1H-2,6-benzodiazonine
1-(5-methoxyphenyl)-6-benzyl-2,3,4,5,6,7-hexahydro-1H-2,6-benzodiazonine
1-p-tolyl-6-methyl-2,3,4,5,6,7-hexahydro-1H-2,6-benzodiazonine
1-(3,5-dimethoxyphenyl)-4,6-diethyl-2,3,4,5,6,7-hexahydro-1H-2,6-benzodiazonine
1-(p-fluorophenyl)-6-benzyl-2,3,4,5,6,7-hexahydro-1H-2,6-benzodiazonine
1-(3,4-methylenedioxyphenyl)-6-methyl-2,3,4,5,6,7-hexahydro-1H-2,6-benzodiazonine
1-(4,5-methylenedioxyphenyl)-6-benzyl-2,3,4,5,6,7-hexahydro-1H-2,6-benzodiazonine The compounds enumerated above as well as the other compounds encompassed by Formula I may be prepared by reacting 2-benzoylbenzoic acid or an appropriately substituted derivative thereof with 3-hydrazinopropanol or an appropriately substituted derivative thereof to form the corresponding 2-(3 - hydroxypropyl) - 4 - phenyl-1-2H-phthalazinone. The latter is then either converted (via halide synthesis) to the corresponding 2-(3-chloropropyl)derivative or reduced to form the corresponding 3 - (3 - hydroxypropyl) - 1 - phenyl - 1,2,3,4 - tetrahydrophthalazine. Either of the compounds thus obtained is then converted to the corresponding 2,3,5,10 - tetrahydro - 1H - pyrazolo[1,2-b]phthalazine which in turn is reacted with an appropriate halide to form the $N_{11}$-(substituted) halide salt thereof. The latter is then converted to the corresponding 4,5,6,7 - tetrahydro - 3H - 2,6-benzodiazonine which is then reduced to form the desired 2,3,4,5,6,7-hexahydro-1H-2,6-benzodiazonine.

The above process may be represented structurally as follows:

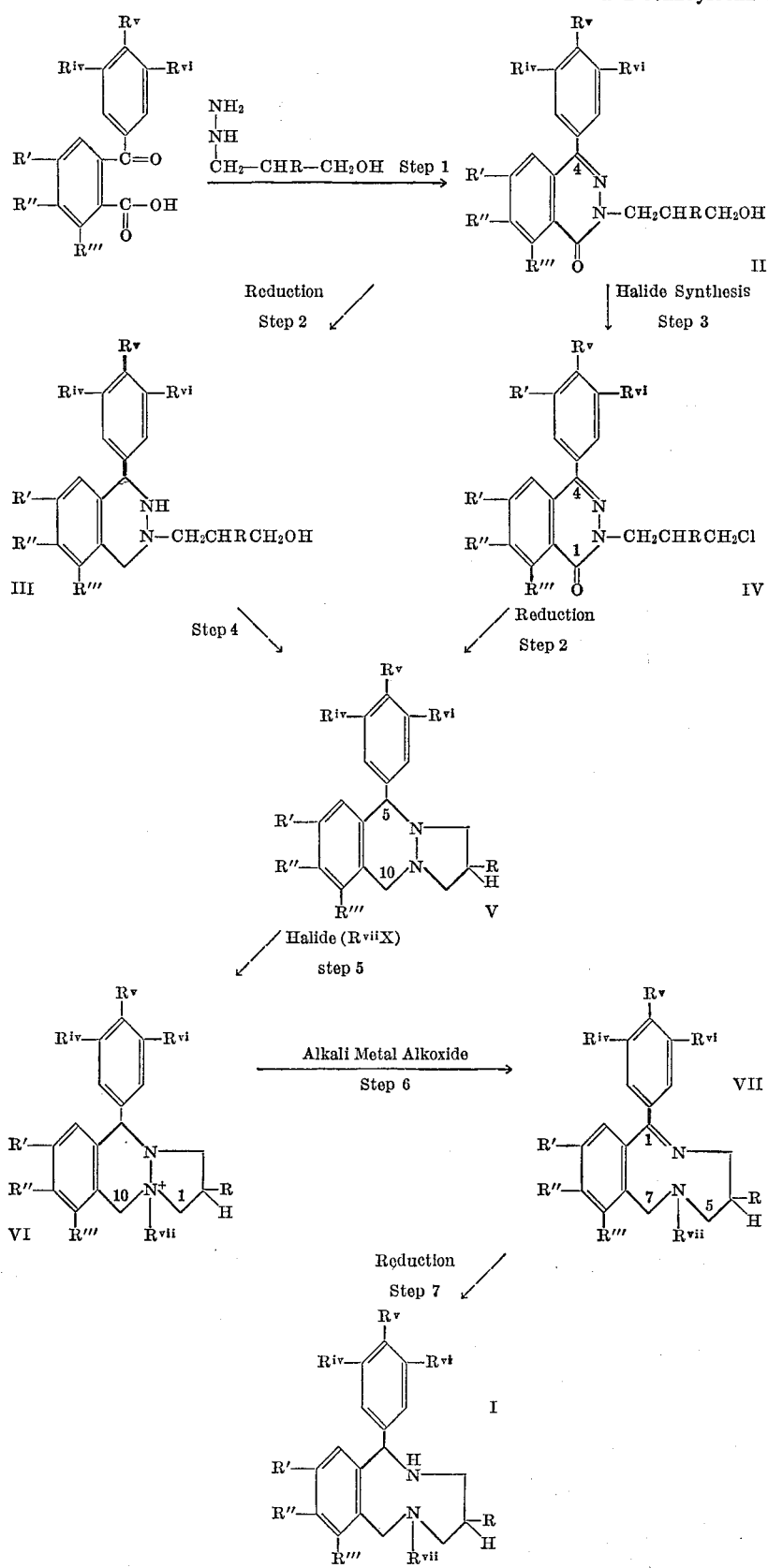

In the above formulae, R, R', R'', R''', R$^{iv}$, R$^v$, R$^{vi}$ and R$^{vii}$ are as above defined and X represents halogen having an atomic weight of at least 35, i.e. chlorine, bromine or iodine.

As illustrated above, Step 1 involves the reaction of a 2-benzoylbenzoic acid with a 3-hydrazinopropanol to form the corresponding phthalazinone (II). This reaction is conveniently carried out in the presence of an inert organic solvent and at elevated temperatures. However, neither the solvent nor temperature employed is critical.

Suitable solvents include benzene, alkylbenzenes, such as toluene or xylene, and cycloalkanes, such as cyclohexane and cycloheptane. Preferably, the reaction is carried out at reflux temperature to effect the continuous removal of water. To facilitate the formation of water, the reaction may be carried out in the presence of a catalytic amount of hydrogen ions such as by the use of an arylsulfonic acid, e.g., benzenesulfonic acid, p-toluenesulfonic acid and the like. The resulting produce (II) can be readily isolated employing conventional techniques.

The reduction (Step 2) of the phthalazinone (II) or (IV) to the corresponding phthalazine (III) or (V), respectively, is readily carried out employing a hydride reducing agent, preferably an aluminum hydride, such as lithium aluminum hydride, butyl aluminum hydride, triisobutyl aluminum hydride and the like. The reduction is conveniently effected in the presence of an inert organic solvent and at an elevated temperature, preferably reflux temperature. Suitable solvents which may be used include the ethers, such as diethyl ether and the like. However, neither the solvent nor temperature employed is critical. The resulting products (III) or (V) are readily recovered in conventional manner. It should be noted that with respect to Step 2 involving the reduction of the phthalazinone (IV) to the corresponding phthalazine (V) it was completely unexpected that reduction and simultaneous ring closure could be effected in this manner.

Step 3 of the process involves the conversion of the 2-(3-hydroxypropyl)-phthalazinone (II) to the corresponding 2-(3-chloropropyl)-phthalazinone (IV). This is accomplished in standard manner employing any of the conventional agents used for this purpose. The preferred agent, however, is thionyl chloride. The reaction is conveniently carried out in any suitable inert organic solvent, such as, for example, benzene, an alkane, such as hexane and the like, and a haloalkane, such as dichloromethane, chloroform, carbon tetrachloride and the like. It is preferred to carry out the reaction at reflux temperature, but it can be caried out at room temperature (20° C.) if desired. The resulting product (IV) can be readily recovered in conventional manner.

The conversion of the phthalazine (III) to the corresponding pyrazolo[1,2-b] phthalazine (V), as indicated by Step 4 of the above reaction scheme, is effected employing the same conditions as set forth for Step 3. This reaction provides via halide synthesis and spontaneous ring closure the phthalazine (V).

Steps 5 and 6 of the process involve the introduction of the substituent $R^{vii}$ into the ring system followed by the opening of the nitrogen-nitrogen bond in the ring. In Step 5 the phthalazine (V) is reacted with an appropriate halide to form the corresponding $N_{11}$-$(R^{vii})$ halide salt thereof (VI). This reaction is conveniently carried out in the presence of a suitable inert organic solvent, such as, for example, an ether such as diethyl ether and the like, an alkane such as pentane, hexane and the like, and an alkyl benzene, such as toluene, xylene and the like. It is preferred to carry out the reaction at room temperature or below although elevated temperatures up to reflux temperature can be employed if desired. The resulting halide salt (VI), which is readily isolated employing conventional techniques, is then converted to the corresponding benzodiazonine (VII) by reacting the halide salt (VI) with an alkali metal alkoxide (Step 6). Suitable alkoxides include the lithium, potassium and sodium derivatives of lower aliphatic alcohols, such as, for example, lithium methoxide, sodium methoxide, sodium ethoxide, potassium methoxide, potassium ethoxide and the like. The reaction is conveniently carried out in a suitable inert organic solvent such as aliphatic alcohol, for example methanol, ethanol, propanol and the like, and at an elevated temperature, preferably reflux temperature. However, neither the solvent nor temperature employed is critical. It should be noted that the opening of the pyrazole ring by the reaction of the halide salt (VI) with the alkali metal alkoxide is indeed unusual. The resulting product (VII) can readily be recovered in conventional manner.

The last step of the process (Step 7), the benzodiazonine (VII), is converted to the desired product (I) by reduction. The reduction can be effected in the same manner as set forth for Step 2. Alternatively, the reduction can be carried out by conventional catalytic hydrogenation employing a suitable catalyst, such as, for example, platinum and palladium. The product (I) is readily recovered employing well-known techniques.

With respect to the various steps of the process discussed above, it is possible that the solvent employed therein can be dispensed with if any of the reactants employed are liquids at the temperature at which the reaction is conducted. In such instances an excess of such reactant can be used in lieu of the solvent.

Various of the reactants employed in Step 1 of the process are known and can be prepared as described in the literature. Such other compounds which are not specifically disclosed in the literature may be readily prepared from available materials by methods analogous to those described in the literature for the preparation of the known compounds.

All of the compounds of structural Formulas I, III, V and VI have asymmetric centers and therefore exist as optically active isomers. Similarly, certain of the compounds of Formulas II, IV and VII (depending upon the substituents attached thereto) exist in optically active forms. Furthermore, those compounds of structural Formulas I, V, VI and VII, wherein R is other than hydrogen, also exist as geometric isomers. Separation and recovery of the respective isomers (optical and/or geometric) may be readily accomplished employing conventional techniques and such isomers are included within the scope of this invention.

The end compounds of the present invention in their free base form (compounds of Formula I) are useful because they possess pharmacological activity. In particular, such compounds are central nervous system stimulants and can be used as anti-depressants. The intermediate compounds of Formula V (in their free base form) are also central nervous system stimulants and therefore useful as anti-depressants. For such usage the above compounds may be combined with a pharmaceutically acceptable carrier, and such other conventional adjuvants, as may be necessary, and administered orally in such forms as tablets, capsules, elixirs, suspensions or solutions, or parenterally in such forms as injectable solutions, suspension or emulsions. Furthermore, the compounds may be similarly administered in the form of their non-toxic, pharmaceutically acceptable acid addition salts. Such salts possess the same order of activity as the free base, are readily prepared in conventional manner by reacting the base with the appropriate acid and accordingly are included within the scope of the invention. Representative of such salts are the mineral acid salts such as the hydrochloride, hydrobromide, sulfate, phosphate and the like and the organic acid salts such as the succinate, benzoate, acetate, maleate, p-toluenesulfonate, benzenesulfonate and the like.

As noted above, the compounds of Formulas I and V exist as isomers. In some cases greater pharmacological activity or other beneficial attribute may be found with respect to a particular isomer and in such instances administration of such isomer may be preferred.

For the above use the dosage administered will, of course, vary depending on the compound employed and mode of administration. However, in general satisfactory results are obtained when administered at a daily dosage of from about 25 milligrams to about 150 milligrams, preferably given in divided doses of from about 5 milligrams to about 75 milligrams, throughout the day or in sustained release form.

A representative formulation suitable for oral administration is a tablet prepared by standard tabletting techniques in place of those employed therein, there are obtained the products set forth below.

| Benzoic acid | Hydrazinopropanol | Product |
| --- | --- | --- |
| 2-benzoylbenzoic acid | 2-methyl-3-hydrazinopropanol | 2-(2-methyl-3-hydroxypropyl)-4-phenyl-1-2H-phthalazinone. |
| 2-benzoylbenzoic acid | 3-hydrazinopropanol | 2-(3-hydroxypropyl)-4-phenyl-1-2H-phthalazinone. |
| 2-benzoylbenzoic acid | 2-cyclopropyl-3-hydrazinopropanol | 2-(2-cyclopropyl-3-hydroxypropyl)-4-phenyl-1-2H-phthalazinone. |
| 5-chloro-2-benzoylbenzoic acid | 3-hydrazinopropanol | 7-chloro-2-(3-hydroxypropyl)-4-phenyl-1-2H-phthalazinone. |
| 6-methyl-2-benzoylbenzoic acid | 2-phenyl-3-hydrazinopropanol | 8-methyl-2-(2-phenyl-3-hydroxypropyl)-4-phenyl-1-2H-phthalazinone. |
| 4,6-dichloro-2-benzoylbenzoic acid | 3-hydrazinopropanol | 6,8-dichloro-2-(3-hydroxypropyl)-4-phenyl-1-2H-phthalazinone. |
| 4,6-dimethyl-2-benzoylbenzoic acid | 3-hydrazinopropanol | 6,8-dimethyl-2-(3-hydroxypropyl)-4-phenyl-1-2H-phthalazinone. |
| 2-(m-chlorobenzoyl)benzoic acid | 3-hydrazinopropanol | 2-(3-hydroxypropyl)-4-(m-chlorophenyl)-1-2H-phthalazinone. |
| 2-(p-methoxybenzoyl)benzoic acid | 3-hydrazinopropanol | 2-(3-hydroxypropyl)-4-(p-methoxyphenyl)-1-2H-phthalazinone. |
| 2-(p-toluoyl)benzoic acid | 3-hydrazinopropanol | 2-(3-hydroxypropyl)-4-(p-tolyl)-1-2H-phthalazinone. |
| 2-(3,4-dichlorobenzoyl)benzoic acid | 2-phenyl-3-hydrazinopropanol | 4-(3,4-dichlorophenyl)-2-(2-phenyl-3-hydroxypropyl)-1-2H-phthalazinone. |
| 2-(3,4-dimethoxybenzoyl)benzoic acid | 3-hydrazinopropanol | 4-(3,4-dimethoxyphenyl)-2-(3-hydroxypropyl)-1-2H-phthalazinone. |
| 2-(3-chloro-p-toluoyl)benzoic acid | 3-hydrazinopropanol | 4-(3-chloro-p-tolyl)-2-(3-hydroxypropyl)-1-2H-phthalazinone. |
| 2-(4,5-methylenedioxybenzoyl)benzoic acid | 3-hydrazinopropanol | 2-(3-hydroxypropyl)-4-(4,5-methylenedioxyphenyl)-1-2H-phthalazinone. |
| 6-methyl-2-(3,4-methylene dioxybenzoyl)benzoic acid. | 3-hydrazinopropanol | 2-(3-hydroxypropyl)-8-methyl-4-(3,4-methylenedioxyphenyl)-1-2H-phthalazinone. |
| 2-(p-fluorobenzoyl)benzoic acid | 3-hydrazinopropanol | 4-(p-fluorophenyl)-2-(3-hydroxypropyl)-1-2H-phthalazinone. | niques and containing the following:

Ingredient: Parts by weight
1-p-chlorophenyl - 2,3,4,5,6,7 - hexahydro-6-methyl-1H-2,6-benzodiazonine (or acid addition salt thereof) (calculated as the free base) _____ 50
Tragacanth _____ 2
Lactose _____ 39.5
Corn starch _____ 5
Talcum _____ 3
Magnesium stearate _____ 0.5

The following examples show representative compounds contemplated by this invention and the manner in which such compounds are prepared. However, it is to be understood that these examples are intended for purposes of illustration only and are not intended as in any way limiting the scope of the invention which is defined in the appended claims.

EXAMPLE 1

2-(3-hydroxypropyl)-4-p-chlorophenyl-1-2H-phthalazinone (II)

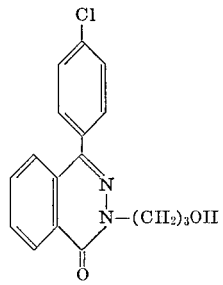

To a flask equipped with a stirrer and Dean-Stark tube is added 130.5 g. (0.5 mole) of 2-(4-chlorobenzoyl)-benzoic acid, 54 g. (0.6 mole) of 3-hydrazinopropanol and 2000 ml. of toluene and the mixture refluxed with stirring until water fails to separate in the Dean-Stark tube. The solvent is then removed on a rotary evaporator and the resulting material added to 200 ml. of methanol. The mixture is then poured with stirring into water, and the resulting solid filtered off to yield 2-(3-hydroxypropyl) - 4 - p - chlorophenyl-1-2H-phthalazinone, M.P. 102–105° C.

EXAMPLE 2

Following the procedure of Example 1 and employing an equivalent amount of the reactants enumerated below in place of those employed therein, there are obtained the products set forth below.

EXAMPLE 3

2-(3-chloropropyl)-4-p-chlorophenyl-1-2H-phthalazinone (IV)

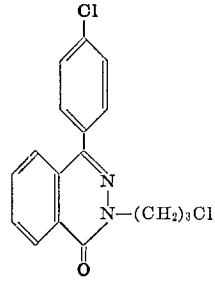

To a flask equipped with a stirrer is added 15.8 g. (0.05 mole) of 2-(3-hydroxypropyl)-4-p-chlorophenyl-1-2H-phthalazinone, 8.9 g. (5.4 ml.) of thionyl chloride and 250 ml. of chloroform and the mixture refluxed with stirring for 20 hours. The mixture is then treated with a cold aqueous solution of sodium bicarbonate and then washed with a saturated aqueous solution of sodium chloride. The chloroform layer is then dried with sodium sulfate, filtered and concentrated on a rotary evaporator. The resulting residue is crystallized from a mixture of methylene chloride and diethyl ether to yield 2-(3-chloropropyl)-4-p-chlorophenyl-1-2H-phthalazinone, M.P. 108–109° C.

EXAMPLE 4

Following the procedure of Example 3 and employing an equivalent amount of the products enumerated in Example 2 for the phthalazinone used in Example 3, there are obtained the products set forth below.

2-(2-methyl-3-chloropropyl)-4-phenyl-1-2H-phthalazinone 2-(3-chloropropyl)-4-phenyl-1-2H-phthalazinone 2-(2-cyclopropyl-3-chloropropyl)-4-phenyl-1-2H-phthalazinone 7-chloro-2-(3-chloropropyl)-4-phenyl-1-2H-phthalazinone 8-methyl-2-(2-phenyl-3-chloropropyl)-4-phenyl-1-2H-phthalazinone 6,8-dichloro-2-(3-chloropropyl)-4-phenyl-1-2H-phthalazinone 6,8-dimethyl-2-(3-chloropropyl)-4-phenyl-1-2H-phthalazinone 2-(3-chloropropyl)-4-(m-chlorophenyl)-1-2H-phthalazinone 2-(3-chloropropyl)-4-(p-methoxyphenyl)-1-2H-
phthalazinone
2-(3-chloropropyl)-4-(p-tolyl)-1-2H-phthalazinone
4-(3,4-dichlorophenyl)-2-(2-phenyl-3-chloropropyl)-
1-2H-phthalazinone
4-(3,4-dimethoxyphenyl)-2-(3-chloropropyl)-1,2H-
phthalazinone
4-(3-chloro-p-tolyl)-2-(3-chloropropyl)-1-2H-
phthalazinone
2-(3-chloropropyl)-8-methyl-4-(3,4-methylenedioxy-
phenyl)-1-2H-phthalazinone
2-(3-chloropropyl)-4-(4,5-methylenedioxyphenyl)-1-
2H-phthalazinone
2-(3-chloropropyl)-4-(p-fluorophenyl)-1-2H-
phthalazinone

EXAMPLE 5

5-p-chlorophenyl-2,3,5,10-tetrahydro-1H-pyrazolo
[1,2-b]phthalazine (V)

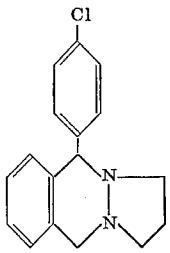

To a flask equipped with stirring apparatus, dropping funnel, gas inlet tube and Soxhlet tube containing 50.0 g. (0.15 mole) of 2-(3-chloropropyl)-4-p-chlorophenyl-1-2H-phthalazinone is added under a nitrogen atmosphere 7.2 g. (0.19 mole) of lithium aluminum hydride and 2000 ml. of anhydrous diethyl ether. The contents of the flask are refluxed with stirring for 48 hours and then cooled in an ice bath. The cooled mixture is then treated with 14.4 ml. of 2 N sodium hydroxide and 21.6 ml. of water, filtered and the filtrate concentrated on a rotary evaporator. The residue is crystallized from diethyl ether to obtain 5-p-chlorophenyl-2,3,5,10-tetrahydro-1H-pyrazolo[1,2-b]phthalazine, M.P. 122–125° C.

The base is dissolved in anhydrous diethyl ether and the resulting solution cooled in an ice bath. Hydrogen chloride gas is then passed through the cooled solution and the solids which form filtered off and crystallized from a mixture of methylene chloride and diethyl ether to obtain 5-p-chlorophenyl - 2,3,5,10 - tetrahydro-1H-pyrazolo[1,2-b] phthalazine hydrochloride, M.P. 189°–192° C.

EXAMPLE 6

Following the procedure of Example 5 and employing an equivalent amount of the products enumerated in Example 4 in place of the phthalazinone employed in Example 5, there are obtained the phthalazines set forth below.

2-methyl-5-phenyl-2,3,5,10-tetrahydro-1H-pyrazolo
[1,2-b]phthalazine
5-phenyl-2,3,5,10-tetrahydro-1H-pyrazolo
[1,2-b]phthalazine
2-cyclopropyl-5-phenyl-2,3,5,10-tetrahydro-1H-pyrazolo
[1,2-b]phthalazine
8-chloro-5-phenyl-2,3,5,10-tetrahydro-1H-pyrazolo
[1,2-b]phthalazine
9-methyl-2,5-diphenyl-2,3,5,10-tetrahydro-1H-pyrazolo
[1,2-b]phthalazine
7,9-dichloro-5-phenyl-2,3,5,10-tetrahydro-1H-pyrazolo
[1,2-b]phthalazine
7,9-dimethyl-5-phenyl-2,3,5,10-tetrahydro-1H-pyrazolo
[1,2-b]phthalazine
5-(m-chlorophenyl)-2,3,5,10-tetrahydro-1H-pyrazolo
[1,2-b]phthalazine
5-(p-methoxyphenyl)-2,3,5,10-tetrahydro-1H-pyrazolo
[1,2-b]phthalazine
5-(p-tolyl)-2,3,5,10-tetrahydro-1H-pyrazolo
[1,2-b]phthalazine
5-(3,4-dichlorophenyl)-2-phenyl-2,3,5,10-tetrahydro-
1H-pyrazolo[1,2-b]phthalazine
5-(3,4-dimethoxyphenyl)-2,3,5,10-tetrahydro-1H-
pyrazolo[1,2-b]phthalazine
5-(3-chloro-p-tolyl)-2,3,5,10-tetrahydro-1H-pyrazolo
[1,2-b]phthalazine
5-(4,5-methylenedioxyphenyl)-2,3,5,10-tetrahydro-1H-
pyrazolo[1,2-b]phthalazine
9-methyl-5-(3,4-methylenedioxyphenyl)-2,3,5,10-tetra-
hydro-1H-pyrazolo[1,2-b]phthalazine
5-(p-fluorophenyl)-2,3,5,10-tetrahydro-1H-pyrazolo
[1,2-b]phthalazine

EXAMPLE 7

1-p-chlorophenyl-3-(3-hydroxypropyl)-1,2,3,4-
tetrahydrophthalazine (III)

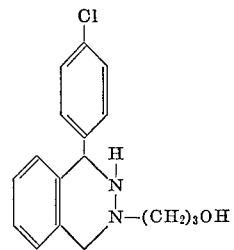

To a flask equipped with a stirring apparatus, dropping funnel, gas inlet tube and Soxhlet tube containing 100 g. (0.32 mole) of 2-(3-hydroxypropyl)-4-p-chlorophenyl-1-2H-phthalazinone is added under nitrogen atmosphere 84.5 g (2.2 mole) of lithium aluminum hydride and 2500 ml. of anhydrous diethyl ether. The contents of the flask are stirred and refluxed for 48 hours and then cooled in an ice bath. The cooled mixture is then treated with 169 ml. of 2 N sodium hydroxide and 253 ml. of water, filtered and the filtrate concentrated on a rotary evaporator to obtain 1-p-chlorophenyl-3-(3-hydroxypropyl)-1,2,3,4-tetrahydrophthalazine as a clear viscous oil.

EXAMPLE 8

Following the procedure of Example 7 and employing an equivalent amount of the products enumerated in Example 2 in place of the phthalazinone employed in Example 7, there are obtained the phthalazines set forth below.

3-(2-methyl-3-hydroxypropyl)-1-phenyl-1,2,3,4-
tetrahydrophthalazine
3-(3-hydhoxypropyl)-1-phenyl-1,2,3,4-
tetrahydrophthalazine
3-(2-cyclopropyl-3-hydroxypropyl)-1-phenyl-1,2,3,4-
tetrahydrophthalazine
6-chloro-3-(3-hydroxypropyl)-1-phenyl-1,2,3,4-
tetrahydrophthalazine
5-methyl-3-(2-phenyl-3-hydroxypropyl)-1,2,3,4-
tetrahydrophthalazine
5,7-dichloro-3-(3-hydroxypropyl)-1-phenyl-1,2,3,4-
tetrahydrophthalazine
5,7-dimethyl-3-(3-hydroxypropyl)-1-phenyl-1,2,3,4-
tetrahydrophthalazine
3-(3-hydroxypropyl)-1-(m-chlorophenyl)-1,2,3,4-
tetrahydrophthalazine
3-(3-hydroxypropyl)-1-(p-methoxyphenyl)-1,2,3,4-
tetrahydrophthalazine
3-(3-hydroxypropyl)-1-(p-tolyl)-1,2,3,4-tetrahydro-
phthalazine
1-(3,4-dichlorophenyl)-3-(2-phenyl-3-hydroxypropyl)-
1,2,3,4-tetrahydrophthalazine
1-(3,4-dimethoxyphenyl)-3-(3-hydroxypropyl)-1,2,3,4-
tetrahydrophthalazine
1-(3-chloro-p-tolyl)-3-(3-hydroxypropyl)-1,2,3,4-
tetrahydrophthalazine 3-(3-hydroxypropyl)-1-(4,5-methylenedioxyphenyl)-
1,2,3,4-tetrahydrophthalazine 3-(3-hydroxypropyl)-5-methyl-1-(3,4-methylenedioxy-
phenyl)-1,2,3,4-tetrahydrophthalazine 3-(3-hydroxypropyl)-1-(p-fluorophenyl)-1,2,3,4-
tetrahydrophthalazine.

EXAMPLE 9

5-p-chlorophenyl-2,3,5,10-tetrahydro-1H-pyrazolo
[1,2-b]phthalazine (V, via Step 4)

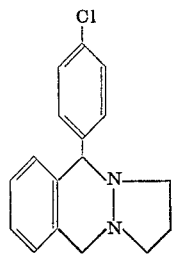

To a flask equipped with a stirrer is added 6.0 g. (0.02 mole) of 1-p-chlorophenyl-3-(3-hydroxypropyl)-1,2,3,4-tetrahydrophthalazine, 2.4 ml. (0.01 mole) of thionyl chloride and 15 ml. of chloroform and the mixture stirred and refluxed for 20 hours. The mixture is then treated with a cold aqueous solution of sodium bicarbonate and then washed with a saturated aqueous solution of sodium chloride. The chloroform layer is separated, dried with sodium sulfate, filtered and then concentrated on a rotary evaporator. The residue is crystallized from a mixture of diethyl ether-pentane to obtain 5-p-chlorophenyl-2,3,5,10-tetrahydro - 1H - pyrazolo[1,2-b]phthalazine, M.P. 123–125° C.

EXAMPLE 10

$N_{11}$-methyliodide salt of 5-p-chlorophenyl-2,3,5,10-
tetrahydro-1H-pyrazolo[1,2-b]phthalazine (VI)

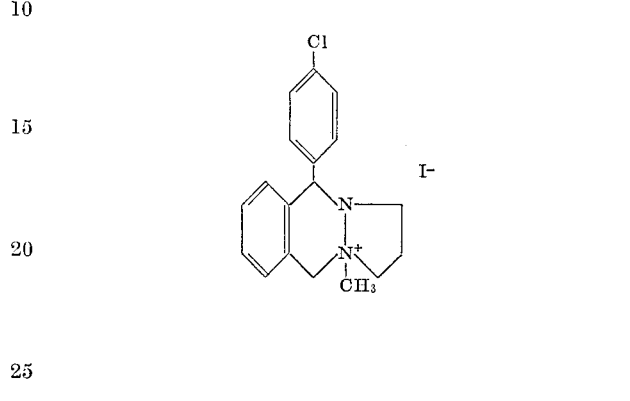

5-p-chlorophenyl - 2,3,5,10 - tetrahydro-1H-pyrazolo [1,2-b]phthalazine, 5.0 g. (0.017 mole), is added to 100 ml. of tetrahydrofuran. Methyl iodide, 5.0 g. (0.035 mole), is then added and the mixture stirred overnight at room temperature. The resulting mixture is diluted with diethyl ether and filtered to obtain the $N_{11}$-methyl iodide salt of 5-p-chlorophenyl-2,3,5,10-tetrahydro-1H-pyrazolo [1,2-b]phthalazine, M.P. 212–213° C.

EXAMPLE 11

Following the procedure of Example 10 and employing an equivalent amount of the reactants enumerated below in place of those employed therein, there are obtained the products set forth below.

| Phthalazine | Halide | Product |
|---|---|---|
| 2-methyl-5-phenyl-2,3,5,10-tetrahydro-1H-pyrazolo [1,2-b]phthalazine. | Allylbromide | $N_{11}$-allyl bromide salt of 2-methyl-5-phenyl-2,3-5-10-tetrahydro-1H-pyrazolo[1,2-b]phthalazine. |
| 5-phenyl-2,3,5,10-tetrahydro-1H-pyrazolo [1,2-b] phthalazine | Benzylchloride | $N_{11}$-benzyl chloride salt of 5-phenyl-2,3,5,10-tetrahydro-pyrazolo[1,2-b]phthalazine. |
| 2-cyclopropyl-5-phenyl-2,3,5,10-tetrahydro-1H-pyrazolo-[1,2-b]phthalazine. | Methyliodide | $N_{11}$-methyl iodide salt of 2-cyclopropyl-5-phenyl-2,3,5,10-tetrahydro-1H-pyrazolo[1,2-b]-phthalazine. |
| 8-chloro-5-phenyl-2,3,5,10-tetra-1H-pyrazolo[1,2-b]phthalazine. | Benzylbromide | $N_{11}$-benzyl bromide salt of 8-chloro-5-phenyl-2,3,5,10- tetrahydro,1H-pyrazolo[1,2-b]phthalazine. |
| 9-methyl-2,5-diphenyl-2,3,5,10-tetrahydro-1H-pyrazolo-[1,2-b]phthalazine. | Methyliodide | $N_{11}$-methyl iodide salt of 9-methyl-2,5-diphenyl-2,3,5,10-tetrahydro-1H-pyrazolo[1,2-b]phthalazine. |
| 7,9-dichloro-5-phenyl-2,3,5,10-tetrahydro-1H-pyrazolo-[1,2-b]phthalazine. | Propargylbromide | $N_{11}$-propargyl bromide salt of 7,9-dichloro-5-phenyl-2,3,5,10-tetrahydro-1H-pyrazolo[1,2-b]phthalazine. |
| 7,9-dimethyl-5-phenyl-2,3,5,10-tetrahydro-1H-pyrazolo-[1,2-b]phthalazine. | Allylbromide | $N_{11}$-allylbromide salt of 7,9-dimethyl-5-phenyl-2,3,5,10-tetrahydro-1H-pyrazolo[1,2-b]phthalazine. |
| 5-(m-chlorophenyl)-2,3,5,10-tetrahydro-1H-pyrazolo[1,2-b]-phthalazine. | Methyliodide | $N_{11}$-methyl iodide salt of 5-(m-chlorophenyl)-2,3,5,10-tetrahydro-1H-pyrazolo[1,2-b]phthalazine. |
| 5-(p-methoxyphenyl)-2,3,5,10-tetrahydro-1H-pyrazolo[1,2-b]-phthalazine. | Propargylbromide | $N_{11}$-propargyl bromide salt of 5-(p-methoxyphenyl)-tetrahydro-1H-pyrazolo[1,2-b]phthalazine. |
| 5-(p-tolyl)-2,3,5,10-tetrahydro-1H-pyrazolo[1,2-b]phthalazine. | Ethyliodide | $N_{11}$-ethyl iodide salt of 5-(p-tolyl)-2,3,5,10-tetrahydro-1H-pyrazolo[1,2-b]phthalazine. |
| 5-(3,4-dichlorophenyl)-2-phenyl-2,3,5,10-tetrahydro-1H-pyrazolo[1,2-b]phthalazine. | Methyliodide | $N_{11}$-methyl iodide salt of 5-(3,4-dichlorophenyl)-2-phenyl-2,3,5,10-tetrahydro-1H-pyrazolo[1,2-b]phthalazine. |
| 5-(3,4-dimethoxyphenyl)-2,3,5,10-tetrahydro-1H-pyrazolo-[1,2-b]phthalazine. | Benzylbromide | $N_{11}$-benzyl bromide salt of 5-(3,4-dimethoxyphenyl)-2,3,5,10-tetrahydro-1H-pyrazolo[1,2-b]phthalazine. |
| 5-(3-chloro-p-tolyl)-2,3,5,10-tetrahydro-1H-pyrazolo[1,2-b]-phthalazine. | Methyliodide | $N_{11}$-methyl iodide salt of 5-(3-chloro-p-tolyl)-2,3,5,10-tetrahydro-1H-pyrazolo[1,2-b]phthalazine. |
| 5-(4,5-methylenedioxyphenyl)-2,3,5,10-tetrahydro-1H-pyrazolo[1,2-b]phthalazine. | Methyliodide | $N_{11}$-methyl iodide salt of 5-(4,5-methylenedioxyphenyl)-2,3,5,10-tetrahydro-1H-pyrazolo[1,2-b]phthalazine. |
| 9-methyl-5-(3,4-methylenedioxyphenyl)-2,3,5,10-tetrahydro 1H-pyrazolo[1,2-b]phthalazine. | Methyliodide | $N_{11}$-methyl iodide salt of 9-methyl-5-(4-methylenedioxyphenyl)-2,3,5,10-tetrahydro-1H-pyrazolo[1,2-b]phthalazine. |
| 5-(p-fluorophenyl)-2,3,5,10-tetrahydro-1H-pyrazolo[1,2-b]-phthalazine. | Methyliodide | $N_{11}$-methyl iodide salt of 5-(p-fluorophenyl)-2,3,5,10-tetrahydro-1H-pyrazolo[1,2-b]phthalazine. |

EXAMPLE 12

1-p-chlorophenyl-6-methyl-4,5,6,7-tetrahydro-3H-2,6-benzodiazonine (VII)

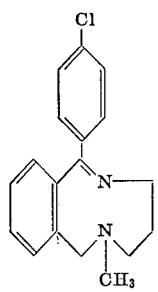

To a flask equipped with a stirrer and containing 20 ml. of absolute methanol is added 1.0 g. of sodium metal. After the sodium has reacted 4.0 g. (0.01 mole) of $N_{11}$-methyl iodide salt of 5-p-chlorophenyl-2,3,5,10-tetrahydro-1H-pyrazolo[1,2-b]-phthalazine in 40 ml. of absolute methanol is added. The mixture is refluxed for 20 hours with stirring and the solvent then removed in vacuo on a rotary evaporator. The residue is extracted with methylene chloride, filtered and the methylene chloride then removed on a rotary evaporator to obtain 1-p-chlorophenyl-6-methyl - 4,5,6,7 - tetrahydro - 3H - 2,6 - benzodiazonine, M.P. 132–134° C.

EXAMPLE 13

Following the procedure of Example 12 and employing an equivalent amount of the products enumerated in Example 11 in place of the phthalazine salt employed in Example 12, there are obtained the products set forth below.

6-allyl-4-methyl-1-phenyl-4,5,6,7-tetrahydro-3H-2,6-benzodiazonine
6-benzyl-1-phenyl-4,5,6,7-tetrahydro-3H-2,6-benzodiazonine
4-cyclopropyl-6-methyl-1-phenyl-4,5,6,7-tetrahydro-3H-2,6-benzodiazonine
6-benzyl-9-chloro-1-phenyl-4,5,6,7-tetrahydro-3H-2,6-benzodiazonine
1,4-diphenyl-6,8-dimethyl-4,5,6,7-tetrahydro-3H-2,6-benzodiazonine
8,10-dichloro-1-phenyl-6-propargyl-4,5,6,7-tetrahydro-3H-2,6-benzodiazonine
6-allyl-8,10-dimethyl-1-phenyl-4,5,6,7-tetrahydro-3H-2,6-benzodiazonine
1-(m-chlorophenyl)-6-methyl-4,5,6,7-tetrahydro-3H-2,6-benzodiazonine
1-(p-methoxyphenyl)-6-propargyl-4,5,6,7-tetrahydro-3H-2,6-benzodiazonine
1-(p-tolyl)-6-ethyl-4,5,6,7-tetrahydro-3H-2,6-benzodiazonine
1-(3,4-dichlorophenyl)-6-methyl-4-phenyl-4,5,6,7-tetrahydro-3H-2,6-benzodiazonine
6-benzyl-1-(3,4-dimethoxyphenyl)-4,5,6,7-tetrahydro-3H-2,6-benzodiazonine
1-(3-chloro-p-tolyl)-6-methyl-4,5,6,7-tetrahydro-3H-2,6-benzodiazonine
6-methyl-1-(4,5-methylenedioxyphenyl)-4,5,6,7-tetrahydro-3H-2,6-benzodiazonine
6,8-dimethyl-1-(3,4-methylenedioxyphenyl)-4,5,6,7-tetrahydro-3H-2,6-benzodiazonine
1-(p-fluorophenyl)-6-methyl-4,5,6,7-tetrahydro-3H-2,6-benzodiazonine

EXAMPLE 14

1-p-chlorophenyl-6-methyl-2,3,4,5,6,7-hexahydro-1H-2,6-benzodiazonine (I)

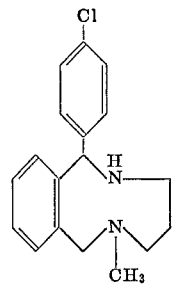

A mixture of 5.4 g. of 1-p-chlorophenyl-6-methyl-4,5,6,7-tetrahydro-3H-2,6-benzodiazonine, 0.60 g. of platinum oxide and 100 ml. of acetic acid (in a Paar hydrogenation bottle) is hydrogenated at 50 p.s.i.g. and room temperature for 12 hours. The catalyst is then filtered off and the solvent removed in vacuo. The residue is made basic with aqueous 2 N sodium carbonate and extracted into chloroform. The chloroform extract is then dried with magnesium sulfate, filtered and the chloroform removed in vacuo. The resulting oily residue is dissolved in a mixture of dichloromethane and diethyl ether and the resulting solution treated with dry hydrogen chloride to yield 1-p-chlorophenyl-6-methyl-2,3,4,5,6,7-hexahydro - 1H - 2,6-benzodiazonine dihydrochloride, M.P. 200–204° C.

EXAMPLE 15

Following the procedure of Example 14 and employing an equivalent amount of the benzodiazonines enumerated in Example 13 in place of the benzodiazonine used in Example 14, there are obtained the products set forth below.

6-allyl-4-methyl-1-phenyl-2,3,4,5,6,7-hexahydro-1H-2,6-benzodiazonine
6-benzyl-1-phenyl-2,3,4,5,6,7-hexahydro-1H-2,6-benzodiazonine
4-cyclopropyl-6-methyl-1-phenyl-2,3,4,5,6,7-hexahydro-1H-2,6-benzodiazonine
6-benzyl-9-chloro-1-phenyl-2,3,4,5,6,7-hexahydro-1H-2,6-benzodiazonine
1,4-diphenyl-6,8-dimethyl-2,3,4,5,6,7-hexahydro-1H-2,6-benzodiazonine
8,10-dichloro-1-phenyl-6-propargyl-2,3,4,5,6,7-hexahydro-1H-2,6-benzodiazonine
6-allyl-8,10-dimethyl-1-phenyl-2,3,4,5,6,7-hexahydro-1H-2,6-benzodiazonine
1-(m-chlorophenyl)-6-methyl-2,3,4,5,6,7-hexahydro-1H-2,6-benzodiazonine
1-(p-methoxyphenyl)-6-propargyl-2,3,4,5,6,7-hexahydro-1H-2,6-benzodiazonine
1-(p-tolyl)-6-ethyl-2,3,4,5,6,7-hexahydro-1H-2,6-benzodiazonine
1-(3,4-dichlorophenyl)-6-methyl-4-phenyl-2,3,4,5,6,7-hexahydro-1H-2,6-benzodiazonine
6-benzyl-1-(3,4-dimethoxyphenyl)-2,3,4,5,6,7-hexahydro-1H-2,6-benzodiazonine
1-(3-chloro-p-tolyl)-6-methyl-2,3,4,5,6,7-hexahydro-1H-2,6-benzodiazonine
6-methyl-1-(4,5-methylenedioxyphenyl)-2,3,4,5,6,7-hexahydro-1H-2,6-benzodiazonine
6,8-dimethyl-1-(3,4-methylenedioxyphenyl)-2,3,4,5,6,7-hexahydro-1H-2,6-benzodiazonine
1-(p-fluorophenyl)-6-methyl-2,3,4,5,6,7-hexahydro-1H-2,6-benzodiazonine

EXAMPLE 16

2-(3-hydroxypropyl)-4-p-methoxyphenyl-1-2H-phthalazinone (II)

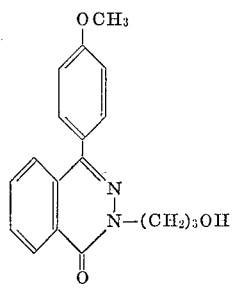

To a flask equipped with a stirrer and Dean-Stark tube is added 46.1 g. (0.18 mole) of 2-(4-methoxybenzoyl)-benzoic acid, 18.0 g. (0.20 mole) of 3-hydrazinopropanol and 500 ml. of toluene and the mixture refluxed with stirring until water fails to separate in the Dean-Stark tube. The solvent is then removed on a rotary evaporater and the resulting material added to 200 ml. of methanol. The mixture is then poured with stirring into water and the resulting solid filtered off and recrystallized from a mixture of toluene and pentane to obtain 2-(3-hydroxypropyl)-4-p-methoxyphenyl-1 - 2H - phthalazinone, M.P. 117–118° C.

EXAMPLE 17

2-(3-chloropropyl)-4-p-methoxyphenyl-1-2H-phthalazinone (IV)

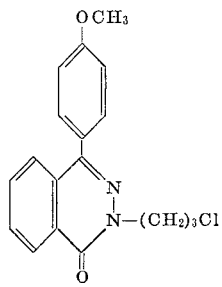

To a flask equipped with a stirrer is added 52 g. (0.168 mole) of 2-(3-hydroxypropyl)-4-p - chlorophenyl-1-2H-phthalazinone, 30 g. (0.252 mole) of thionyl chloride and 500 ml. of chloroform and the mixture refluxed with stirring for 20 hours. The mixture is then treated with a cold aqueous solution of sodium bicarbonate and then washed with a saturated aqueous solution of sodium chloride. The chloroform layer is then dried with sodium sulfate, filtered and concentrated on a rotary evaporater. The resulting residue is crystallized from a mixture of chloroform and pentane to obtain 2-(3-chloropropyl)-4-p-methoxyphenyl-1-2H-phthalazinone, M.P. 95–96.5° C.

EXAMPLE 18

5-p-methoxyphenyl-2,3,5,10-tetrahydro-1H-pyrazolo[1,2-b]phthalazine (V)

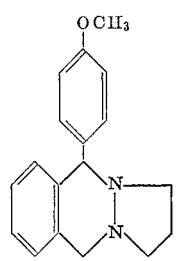

To a flask equipped with a stirring apparatus, dropping funnel, gas inlet tube and Soxhlet tube containing 45.0 g. (0.137 mole) of 2-(3-chloropropyl) - 4 - p - methoxyphenyl-1-2H-phthalazinone is added under a nitrogen atmosphere 13.0 g. (0.34 mole) of lithium aluminum hydride and 1500 ml. of anhydrous diethyl ether. The contents of the flask are refluxed with stirring for 4 days and then cooled in an ice bath. The cooled mixture is then treated with 26 ml. of 2 N sodium hydroxide and 39 ml. of water, filtered and the filtrate concentrated on a rotary evaporater. The residue is crystallized from a mixture of diethyl ether, methylene chloride and pentane to obtain 5-p-methoxyphenyl-2,3,5,10-tetrahydro - 1H - pyrazolo-[1,2-b]-phthalazine, M.P. 107–109° C.

The base is dissolved in anhydrous diethyl ether and the resulting solution cooled in an ice bath. Hydrogen chloride gas is then passed through the cooled solution and the solids which form filtered off and crystallized from a mixture of methylene chloride and diethyl ether to obtain very hygroscopic 5-p-methoxyphenyl-2,3,5,10-tetrahydro-1H-pyrazolo[1,2-b]phethalazine hydrochloride, with indefinite melting point.

EXAMPLE 19

2-(3-hydroxypropyl)-4-phenyl-1-2H-phthalazinone (II)

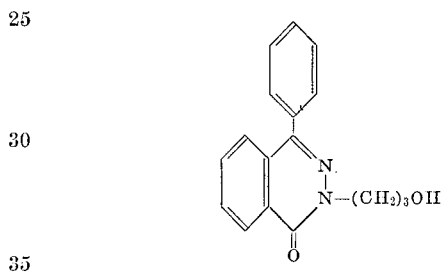

To a flask equipped with a stirrer and Dean-Stark tube is added 45.2 g. (0.2 mole) of 2-benzoylbenzoic acid, 22.5 g. (0.25 mole) of 3-hydrazinopropanol, 500 ml. of toluene and 1.0 g. of p-toluenesulfonic acid and the mixture refluxed with stirring until water fails to separate in the Dean-Stark tube. The solvent is then removed on a rotary evaporater and the resulting material added to 200 ml. of methanol. The mixture is then poured with stirring into water and the resulting solid filtered off to yield 2-(3-hydroxypropyl)-4-phenyl-1-2H-phthalazinone, M.P. 138–139° C.

EXAMPLE 20

2-(3-chloropropyl)-4-phenyl-1-2H-phthalazinone (IV)

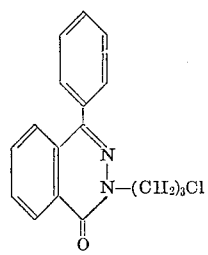

To a flask equipped with a stirrer is added 49.0 g. (0.18 mole) of 2-(3-hydroxypropyl)-4-phenyl-1-2H-phthalazinone, 25 g. (0.2 mole) (15.2 ml.) of thionyl chloride and 250 ml. of chloroform and the mixture refluxed with stirring for 20 hours. The mixture is then treated with a cold aqueous solution of sodium bicarbonate and then washed with a saturated aqueous solution of sodium chloride. The chloroform layer is then dried with sodium sulfate, filtered and concentrated on a rotary evaporater. The resulting residue is crystallized from methylene chloride-diethyl ether-pentane to yield 2-(3-chloropropyl)-4-phenyl-1-2H-phthalazinone, M.P. 127–128° C.

EXAMPLE 21

5-phenyl-2,3,5,10-tetrahydro-1H-pyrazolo[1,2-b]phthalazine (V)

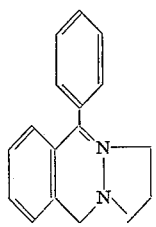

To a flask equipped with a stirring apparatus, dropping funnel, gas inlet tube and Soxhlet tube containing 35 g. (0.12 mole) of 2-(3-chloropropyl) - 4 - phenyl - 1 - 2H-phthalazinone is added under a nitrogen atmosphere 11.2 g. (0.3 mole) of lithium aluminum hydride and 1500 ml. of anhydrous diethyl ether. The contents of the flask are refluxed with stirring for 48 hours and then cooled in an ice bath. The cooled mixture is then treated with 22 ml. of 2 N sodium hydroxide and 34 ml. of water, filtered and the filtrate concentrated on a rotary evaporator to yield 5-phenyl - 2,3,5,10 - tetrahydro-1H-pyrazolo[1,2-b] phthalazine as an oil. The oil is dissolved in anhydrous diethyl ether and the resulting solution cooled in an ice bath. Hydrogen chloride gas is then passed through the cooled solution and the solids which form filtered off and dried to yield 5-phenyl-2,3,5,10-tetrahydro-1H-pyrazolo[1,2-b]phthalazine hydrochloride, M.P. 197–199° C.

What is claimed is:

1. A compound of the formula

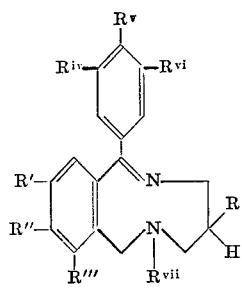

wherein

R represents hydrogen, lower alkyl, cyclolower alkyl or phenyl;

R', R" and R''' each independently represent hydrogen, chlorine or straight chain lower alkyl;

$R^{iv}$, $R^v$ and $R^{vi}$ each independently represent hydrogen, chlorine, fluorine, straight chain lower alkyl, straight chain lower alkoxy; or $R^v$ together with either $R^{iv}$ or $R^{vi}$ form a methylenedioxy bridge; and $R^{vii}$ represents straight chain lower alkyl, allyl, propargyl or benzyl.

2. The compound of claim 1 which is 1-p-chlorophenyl-6-methyl-4,5,6,7-tetrahydro-3H-2,6-benzodiazonine.

3. A compound selected from the group consisting of benzodiazonines of the formula

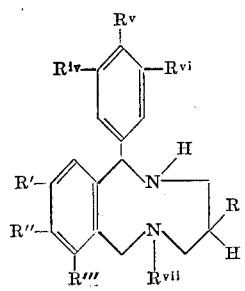

and pharmaceutically acceptable acid addition salts thereof wherein

R represents hydrogen, lower alkyl, cyclolower alkyl or phenyl;

R', R" and R''' each independently represent hydrogen, chlorine or straight chain lower alkyl;

$R^{iv}$, $R^v$ and $R^{vi}$ each independently represent hydrogen, chlorine, fluorine, straight chain lower alkyl, straight chain lower alkoxy or $R^v$ together either $R^{iv}$ or $R^{vi}$ form a methylenedioxy bridge; and $R^{vii}$ represents straight chain lower alkyl, allyl, propargyl or benzyl.

4. The compound of claim 3 which is 1-p-chlorophenyl-6-methyl-2,3,4,5,6,7-hexahydro-1H-2,6-benzodiazonine.

5. The compound of claim 3 which is 1-p-chlorophenyl-6-methyl-2,3,4,5,6,7-hexahydro-1H-2,6-benzodiazonine dihydrochloride.

6. A process which comprises contacting a compound of the formula

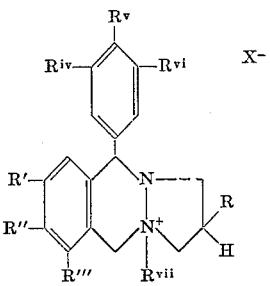

wherein

R represents hydrogen, lower alkyl, cyclolower alkyl or phenyl;

R', R" and R''' each independently represent hydrogen, chlorine or straight chain lower alkyl;

$R^{iv}$, $R^v$ and $R^{vi}$ each independently represent hydrogen, chlorine, fluorine, straight chain lower alkyl, straight chain lower alkoxy; or $R^v$ together with either $R^{iv}$ or $R^{vi}$ form a methylenedioxy bridge;

$R^{vii}$ represents straight chain lower alkyl, allyl, propargyl or benzyl; and X represents halogen having an atomic weight of at least 35, with an alkali metal alkoxide thereby forming by simultaneous dehydrogenation and opening of the pyrazole ring a compound as defined in claim 3.

7. A process of claim 6 wherein the alkali metal alkoxide is comprised of an alkali metal selected from the group consisting of lithium, potassium and sodium and an alkoxide residue derived from a lower aliphatic alcohol.

References Cited

FOREIGN PATENTS 3,434  7/1965  France _____ 260—239

ALTON D. ROLLINS, Primary Examiner

U.S. Cl. X.R.

260—250, 340.5, 517, 563, 569, 584; 424—244, 282